United States Patent Office 2,852,490
Patented Sept. 16, 1958

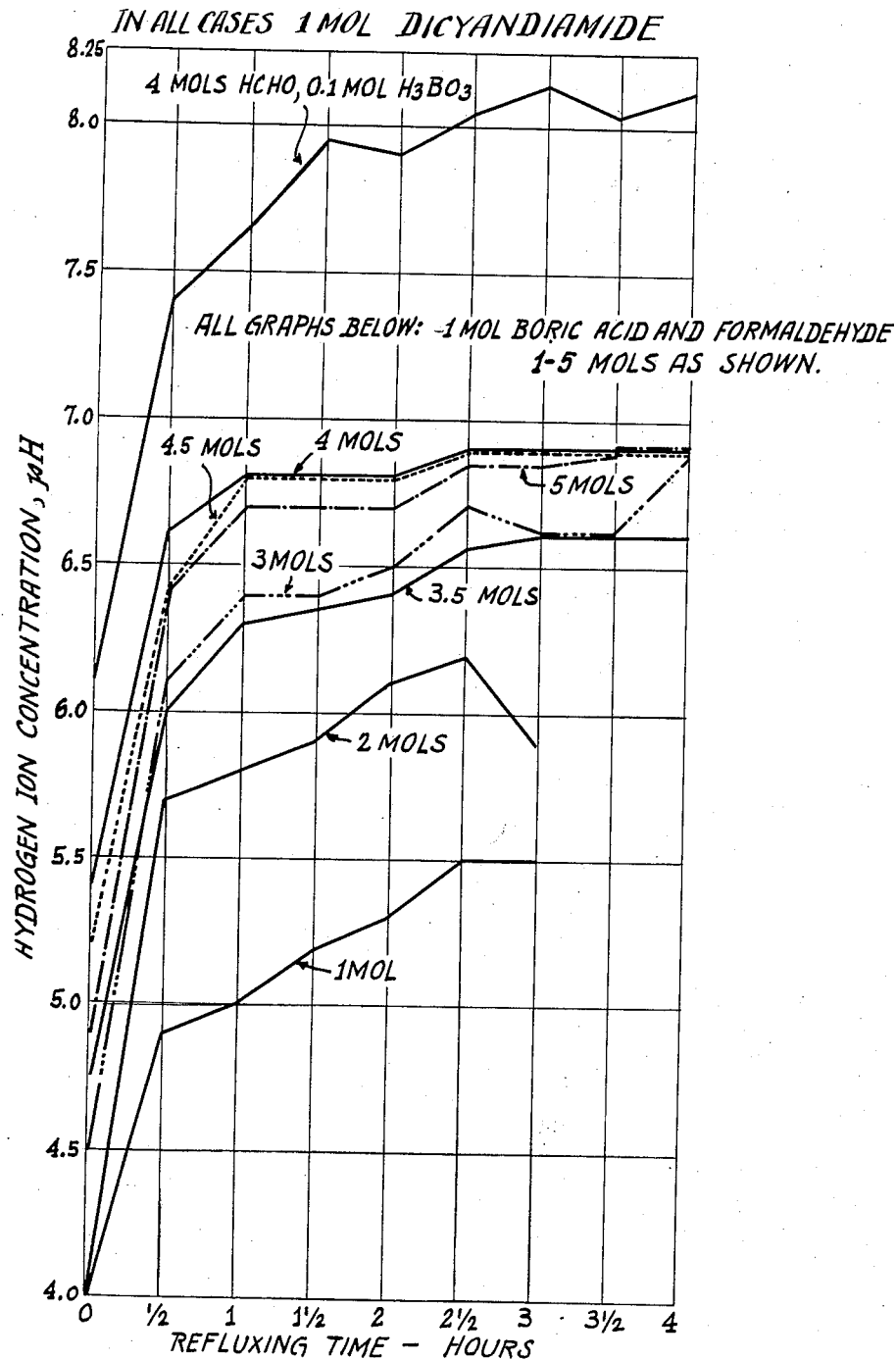

2,852,490

DICYANDIAMIDE, FORMALDEHYDE AND BORIC ACID CONDENSATION PRODUCT

Lucien Sellet, Saddle River, N. J., and William O. Dawson, Amherst, N. H., assignors to Jacques Wolf & Co., a corporation of New Jersey Application July 21, 1954, Serial No. 444,832

3 Claims. (Cl. 260—69)

This invention relates to the resinous reaction product of dicyandiamide, formaldehyde and boric acid.

In our Patent 2,567,238, issued September 11, 1951, we describe a condensation product of dicyandiamide with 3.6–5 mols of formaldehyde. The condensation is effected in aqueous solution. Then the solution is spray dried. The product is a white powder that is readily soluble in cold water and, in the dry form, is stable over long periods of time.

In our copending application Serial No. 277,292, filed March 18, 1952, now abandoned, we describe a related process and also a reaction product that is less unstable in aqueous solutions and that, on standing, undergoes further polymerization and attendant thickening. In this copending application we react dicyandiamide with formaldehyde in aqueous solution and then introduce boric acid in free condition and continue the reaction.

In another copending application Serial No. 363,689, filed June 23, 1953, now issued as Patent 2,737,464, we describe, in one example, interaction of dicyandiamide and formaldehyde with boric acid present from the start and use the product to impregnate fibrous materials.

The present application is a continuation in part of the said copending applications.

Briefly stated, the present invention comprises the process of and the product resulting from introducing boric acid in free condition into mixed aqueous dicyandiamide and formaldehyde, the boric acid being introduced in advance of any substantial initial reaction between the dicyandiamide and formaldehyde, and maintaining contact of the three reactants initially at a pH on the acid side of 7 until reaction is substantially complete. In commercial practice, the three reactants are mixed in aqueous solution before the temperature of the mix is raised to that at which reaction becomes rapid and the elevated temperature of rapid reaction is maintained until the pH, below 7 at the start, rises and then ceases to rise rapidly.

The change in pH during the refluxing at about 95° C. is illustrated in the figure of the drawing to which reference is made.

The dicyandiamide ordinarily used is the commercial dry material. The formaldehyde is used in its aqueous solution such as 37% formalin or any one of the commercial aqueous compositions including also a lower aliphatic alcohol or paraformaldehyde may be used. The boric acid is supplied to advantage in crystal form.

The proportion of the formaldehyde should be within the range 3.5–5 mols for 1 mol of the dicyandiamide. When proportions of formaldehyde below 3.5 are used, then there is haziness or insolubility in cold water, either of which is objectionable, particularly in applications of the product for impregnating fibrous materials. There is no need of using larger, uneconomical proportions of the formaldehyde than 5 mols, as the 5 mols give good, clear solutions of adequate stability on standing.

The proportion of boric acid used is 0.1–1 mol for 1 of dicyandiamide. Below 0.1 mol, haze or instability results, instability being evidenced by gelling or objectionable rate of thickening on storage of the aqueous solution. More than 1 mol of the boric acid, on the other hand, is unnecessary for satisfactory properties of the reaction product.

With proportions within the ranges stated, the products of the invention are resins that are soluble in either hot or cold water to give solutions that are clear and that remain clear without gelling or over-thickening for periods up to several months or longer.

Proportions of boric acid within the upper part of the range 0.1–1 mol give stability for longer periods of time than proportions near the lower limit. Solutions with 1 mol have remained stable for a year.

The reaction of the three components is effected in aqueous solution that initially is acid. To obtain a rate satisfactory in factory operations, the reaction is conducted at an elevated temperature, as within the range 70°–100° C. Autoclave temperatures up to about 140° C. may be used, but there is no necessity of using any temperature above that of refluxing of the mixture at atmospheric pressure, this being about 95° C. In general, it will be understood that the rate of reaction increases with the temperature. Under refluxing conditions the reaction is ordinarily complete in about 3–4 hours, 3.5 being adopted as the period of heating in regular operations.

In spite of the previous observations that an alkaline catalyst is desirable in accelerating the condensation of dicyandiamide with formaldehyde, we now find that the introduction of the boric acid makes the incorporation of any alkaline catalyst of condensation unnecessary for a good rate of reaction. In fact, the introduction of the alkaline catalyst or any inorganic buffer for boric acid is undesirable in the present process.

The invention will be illustrated in greater detail by description in connection with the specific examples that follow. In these examples and elsewhere herein, 1 mol of dicyandiamide was supplied in the form of 84 parts of crystals, each mol of formaldehyde by 81 parts of its 37% aqueous solution, and each one-tenth mol of boric acid by 6.2 parts, all proportions unless otherwise stated being expressed as parts by weight.

*Examples 1–3*

In each preparation of this section, water was added in amount required, if any, to make the total volume of the formaldehyde solution and added water equal to 300 ml. for each gram molecule of the dicyandiamide.

All the mixes were made complete including the boric acid before heating was undertaken. Then they were raised to refluxing and kept at that temperature of about 95° C. for 3.5 hours. At that time the pH had risen as illustrated in the drawing from less than 7 at the start to higher levels and had become practically constant within the limit of experimental errors due to minor variations in the processing including loss of vapor during refluxing and sampling. The heating was then discontinued.

The following table shows the molar proportions; the pH's, to the first decimal place, at the start of the refluxing and also after the 3.5 hours' refluxing; and also the solubility of the product in water.

The unnumbered tests or first three runs show the unsatisfactory solubility that results with formaldehyde proportions below 3.5.

| Example No. | Proportions for 1 mol dicy | | pH of Solution | | Product Soluble to Clear Solution | |
|---|---|---|---|---|---|---|
| | HCHO | $H_3BO_3$ | At the Start | After 3.5 Hrs. | Cold | Hot Water |
| | 1 | .1 | 4.0 | [1] 5.5 | No | Partially. |
| | 2 | 1 | 4.0 | [1] 5.9 | No | Nearly completely. |
| | 3 | 1 | 4.5 | 6.6 | No | Yes. |
| 1 | 3.5 | 1 | 4.7 | 6.6 | Yes | Yes. |
| 2 | 4 | 1 | 5.4 | 6.9 | Yes | Yes. |
| 3 | 5 | 1 | 4.9 | 6.9 | Yes | Yes. |

[1] The pH values for products made with 1 and 2 mols of formaldehyde were determined at the end of 3 hours. Observations of solubility made at the end of 3½ hours show, however, that these products were not completely soluble even in hot water, the reaction products in both cases settling out in part at least as white sticky material.

When the product solutions were diluted to concentrations of 10% by weight, before the pH tests were made upon them, the pH's found were considerably higher than for the full strength solutions. Thus the final pH's for Examples 1 and 3 in 10% solutions were 8.1 and 7.9, respectively.

It will be noted that the products with 3.5–5 mols of formaldehyde were soluble and gave clear solutions in cold water. Products made similarly but with 3 mols of formaldehyde were insoluble in cold water.

All of the products of the several preparations of the above table were cation active at the end of the heating period.

After cooling, the products of Examples 1–3 were ready for shipping in their cold aqueous solutions, either at full strength or after dilution, and are useful in the impregnation of leather and other fibrous materials as described in our said application Ser. No. 363,689, as are products of Examples 4 and 5.

*Example 4*

The procedure of Example 2 was followed except that the proportion of boric acid was reduced to 0.1 mol for 1 mol of the dicyandiamide and 4 mols of formaldehyde.

The pH at the start of the refluxing was 6.1, after 2 hours' refluxing 7.9, after 3.5 hours 8.0, and after 4 hours 8.1, when the refluxing was stopped.

The product was soluble in cold water to a clear solution and stable on aging for the important commercial period between manufacture, shipping and reasonable storage before use. The product was cation active.

Like results were obtained when 0.25 mol of boric acid and 0.50 mol were substituted in turn for the 0.1 mol above. pH's were 6.1 at the start and 7.2 after 3.5 hours with 0.25 mol of boric acid used and 6.3 and 7.3 for 0.5 mol. In general, stability is improved as the proportion of boric acid is increased within the range 0.1–1 mol.

*Example 5*

As described in our copending application Ser. No. 363,687, dicyandiamide, formaldehyde and boric acid were reacted as follows:

168 lbs. of dicyandiamide (2 mols), 648 lbs. of 37% formaldehyde solution (8 mols), and 124 lbs. of boric acid powder (2 mols) were mixed with 350 lbs. of water and the whole mixture heated to a boil until the boric acid dissolved and then refluxed for 3.5 hours at a temperature between 92° and 95° C.

All the products of Examples 1–5 are resins that are soluble in cold or hot water, to form clear solutions that are dilutable up to 10 volumes or more with water without precipitation and that are stable (non-gelling) on storage for periods up to several months or longer, even at winter temperatures.

In general, we consider that the boric acid, added at or before the start of the condensation of dicyandiamide and boric acid, combines with basic groups as basicity develops progressively during the reaction. This continuing action of the boric acid is more effective, per unit proportion of the boric acid used, in preventing overcondensation and ultimate thickening up or actual gelling of the solution, than is the same weight of boric acid added after the dicyandiamide and formaldehyde have been already condensed together. We use, therefore, a smaller proportion of boric acid for a given extent of stabilization than is required when the boric acid is added after the condensation between the dicyandiamide and formaldehyde has been effected.

It will be understood that it is intended to cover all changes and modifications of the examples of the invention herein chosen for the purpose of illustration which do not constitute departures from the spirit and scope of the invention.

What we claim is:

1. The condensation product of dicyandiamide, formaldehyde, and boric acid in the molecular proportions of 1, 3.5–5 and 0.1–1, respectively, the product being resinous, soluble in both cold and hot water, non-precipitating on extreme dilution of the aqueous solution, and stable in the aqueous solution on standing and being the product of heating, at a pH below 7 initially, a mixture of the dicyandiamide, formaldehyde, and boric acid in aqueous solution until the pH of the solution rises and becomes practically constant.

2. In making a resin that is soluble in cold water and stable in aqueous solution, the process which comprises forming a mixture of dicyandiamide, formaldehyde, and boric acid in aqueous solution and in the molecular proportions of 1, 3.5–5 and 0.1–1, respectively, and maintaining contact between the materials of the mixture at an elevated temperature and at a pH initially below 7 until the pH rises and becomes practically constant and the resulting clear solution forms no precipitate on extreme dilution with cold water.

3. The process of claim 2 which includes maintaining the said contact at approximately the temperature of refluxing of the aqueous solution and until the pH rises to a level above about 6.5 and becomes practically constant.

References Cited in the file of this patent

UNITED STATES PATENTS

| 2,207,442 | Ripper | July 9, 1940 |
| 2,567,238 | Sellet et al. | Sept. 11, 1951 |

FOREIGN PATENTS

| 476,043 | Great Britain | Nov. 29, 1937 |